United States Patent Office 3,102,919
Patented Sept. 3, 1963

3,102,919
PROCESS FOR THE REMOVAL OF CARBON MONOXIDE FROM OLEFIN-CONTAINING GAS MIXTURES
Joseph Hirschbeck and Freimuth Lohöfer, both of Burgkirchen, Upper Bavaria, Germany, assignors to Farbwerke Hoechst Aktiengesellschaft vormals Meister Lucius & Brüning, Frankfurt am Main, Germany, a corporation of Germany
No Drawing. Filed May 6, 1960, Ser. No. 27,242
Claims priority, application Germany May 15, 1956
6 Claims. (Cl. 260—677)

This application is a continuation-in-part of our application Serial No. 658,517, filed May 13, 1957, now abandoned.

The present invention relates to a process for the removal of carbon monoxide from olefin-containing gas mixtures which contain small amounts of said carbon monoxide.

It is known to separate olefins from mixtures of hydrocarbons by means of cuprous salts whereby the olefins are generally obtained in high concentration. In case, however, the gas mixture to be processed additionally contains carbon monoxide, such as pyrolysis gas mixtures, the solution of cuprous salt also absorbs the carbon monoxide as well as the olefins. In the desorption step, the carbon monoxide is desorbed together with the olefins. Thus, olefins are obtained which contain carbon monoxide that is often undesired and disturbing in subsequent processing.

It has already been proposed to purify carbon monoxide-containing gas mixtures which do not contain olefins by contacting the mixtures with cupric salts which contain small amounts of catalytically active substances which are either dissolved or applied by impregnation to solid substances, such as active carbon whereby the carbon monoxide is oxidized to carbon dioxide.

Now we have found a process by which small amounts of carbon monoxide are removed from olefin-containing hydrocarbon mixtures or from already isolated high-percent olefins which process consequently does not depend on the degree of the olefin content. The process according to the invention consists in contacting olefin-containing gas mixtures which additionally contain carbon monoxide with aqueous acid solutions which contain in addition to cupric salts also cuprous salts and, critically, a small amount of one or more salts of one or more noble metals of group VIII of the periodic system. The use of these noble metal salts is important in that the reaction is accelerated and lower temperatures may be used. In addition to salts of bivalent copper, the solution must initially contain considerable portions of cuprous compounds, namely in an amount which is far in excess of the cuprous content formed by the reaction of the cupric salt with the carbon monoxide. Obviously, the carbon monoixed is oxidized faster by the cupric ions in the presence of a considerable excess of cuprous salts which is probably due to the fact that the carbon monoxide is dissolved by the cuprous salts and converted into a state which is especially readily oxidizable.

The process of the present invention can be carried out under any pressure. If atmospheric pressure is applied, the process is operated at a temperature range between 20 and 100° C. In case higher pressures are applied, it is also possible to operate at higher temperatures since under these elevated pressures the boiling point of the solution is also increased.

It may be of advantage to carry out the reaction under elevated pressure and at correspondingly increased temperatures, for example 1 absolute atmosphere/90° C., 2 atmospheres/110° C., 3 atmospheres/124° C., 4 atmospheres/134° C., 4.7 atmospheres/140° C., 6.1 atmospheres/150° C., 7.8 atmospheres/160° C., 9.9 atmospheres/170° C., 12.4 atmospheres/180° C., 15.4 atmospheres/190° C. However, when contacting equal portions (by weight) of gas at atmospheric or elevated pressure, lower temperatures than would be suitable at atmospheric pressure may also be applied for superatmospheric pressures since an increased amount of gas is dissolved and accordingly the gases are better contacted with the solution and remain in contact longer with the solution. But it is especially advantageous to work under atmospheric pressure since in this case there exists a minimum of difficulties pertaining to apparatus.

With the known affinity of carbon monoxide to monovalent copper salts, it might have been expected that the carbon monoxide would only be removed partially by the washing process claimed by the present invention. It was also to be expected that at least part of the olefins, which as is known also react with cuprous salts, would be lost by the treatment according to the invention. Practical tests proved, however, that in the process of the invention only immaterial amounts of olefins are lost.

The process according to the invention is suitably carried out in the form of a washing process by treating the olefin-containing gas mixtures which are to be freed of carbon monoxide under any pressure in co- or counter-current with the aforesaid solutions. An especially pronounced effect can be obtained with solutions containing 70–10% of the copper in the cupric stage and 30–90% of the copper in the cuprous stage. It may also be possible to obtain good results with smaller cuprous contents, especially in the case where relatively small amounts of the gas mixture are processed. The salts of the noble metals of group VIII of the periodic system are added, for example, in an amount of 0.2–0.5 gram per 100 grams of copper, such as palladium chloride, palladium nitrate, iridium chloride, ruthenium chloride, platinum chloride or rhodium chloride. The use of these group VIII salts is a critical feature of the present process in that the reaction is greatly accelerated. For example, hydrochloric acid solutions can be used, which may contain salts of ammonia, or of organic nitrogen bases, especially amines or hydroxyalkylamines, such as phenetidin, piperidine, pyridine, ethanolamine, diethanolamine and propanolamine. The copper solution used is regenerated by treating it in known manner with air or oxygen, preferably also at elevated temperature, which preferably is the same as in the absorption stage.

The process according to the present invention is suitable for the treatment of gas mixtures in which the olefins are present in admixture with other gaseous substances and for the treatment of gas mixtures in which the olefins are fairly concentrated, for example up to a content of 90% and more. The process can, therefore, be carried out at any place in the working up of olefin-containing gas mixtures.

The following examples serve to illustrate the invention but they are not intended to limit it thereto:

Example 1

In a tube filled with Raschig rings and having an inside diameter of 50 mm., 75 liters of gas consisting of 92.4% by volume of ethylene and 4.4% by volume of carbon monoxide are treated per hour at 80° C. in a countercurrent manner with 400 cc. of an acid solution containing per liter 48 grams of copper in the form of cuprous chloride and 72 grams of copper in the form of cupric chloride, to which solution 2 cc. of a palladium chloride solution have been added, containing 10% of palladium. In the gas leaving the apparatus it is not possible to detect any carbon monoxide by the analysis according to Orsat (cf. Berl-Lunge, Chemisch-technische Untersuchungsmethoden, volume 1 (1931), page 686 et seq.).

In case the gas is treated with a copper chloride solution containing the same amount of copper but only in the bivalent form, the other conditions remaining the same, the final gas still contains up to 1% by volume of carbon monoxide.

*Example 2*

The same amount of the gas described in Example 1 is treated as defined above with a solution having the aforesaid composition with the exception that it contains instead of palladium chloride 0.5 gram of rhodium in the form of rhodium chloride. In the gas leaving the apparatus carbon monoxide can no longer be detected by the Orsat analysis.

*Example 3*

1 liter of a hydrochloric acid-copper salt solution containing 60 grams of cuprous chloride, 40 grams of cupric chloride and 0.35 gram of palladium as palladium chloride is conducted per hour at atmospheric pressure and at 60° C. from below through a tube having an inside diameter of 25 mm. Said copper salt solution is contacted per hour with 50 liters of a gas which enters the solution also from below through a gas distributing plate and streams through the solution. The Orsat analysis indicates the following compositions of the gas, prior and after the treatment:

|  | Entering gas, percent by volume | Leaving gas, percent by volume |
|---|---|---|
| $CO_2$ | 0.0 | 9.6 |
| $C_2H_4$ | 72.4 | 72.4 |
| Higher olefins | 9.9 | 9.9 |
| CO | 9.6 | 0.0 |
| Rest | 8.1 | 8.1 |
|  | 100.0 | 100.0 |

The copper salt solution leaving the reaction tube is conducted without heating and by means of a pump to a second reaction tube where it is treated with 2.5 liters of oxygen per hour so as to re-adjust the solution to its original composition and then it is reconducted to the first reactor after having been re-heated, if necessary, to 60° C.

When the carbon monoxide is removed from the same gas mixture in the same apparatus under identical conditions, with the exception that a pressure of 2 atmospheres and a temperature of 110° C. are applied, about the same results are obtained.

*Example 4*

2 liters of a hydrochloric acid copper salt solution containing per liter 65 grams of cuprous chloride, 35 grams of cupric chloride and 0.4 gram of rhodium in the form of rhodium chloride are conducted per hour at atmospheric pressure and at 60° C. from below through a tube having an inside diameter of 25 mm. Said solution is contacted per hour with 50 liters of a gas entering the tube through a gas distributing plate and streaming through the tube likewise from below. The Orsat analysis indicates the following compositions of the gas prior and after the reaction with the above copper salt solution:

|  | Entering gas, percent by volume | Leaving gas, percent by volume |
|---|---|---|
| $CO_2$ | 0.0 | 9.6 |
| $C_2H_4$ | 72.4 | 72.4 |
| Higher olefins | 9.9 | 9.9 |
| CO | 9.6 | 0.0 |
| Rest | 8.1 | 8.1 |
|  | 100.0 | 100.0 |

The copper salt solution leaving the reaction tube is conducted without heating and by means of a pump to a second reaction tube where it is treated with 2.5 liters of oxygen per hour so as to re-adjust the solution to its original composition and then it is reconducted to the first reactor after having been re-heated, if necessary, to 60° C.

*Example 5*

In the apparatus described in the preceding example 40 liters of crude gas are treated per hour at atmospheric pressure and at 20° C. with 2 liters of a hydrochloric acid copper salt solution containing per liter 80 grams of cuprous chloride, 35 grams of cupric chloride and 4 cc. of a palladium chloride solution containing 10% of palladium.

The Orsat analysis indicated the following compositions of the crude gas and the gas leaving the reactor:

|  | Entering gas, percent by volume | Leaving gas, percent by volume |
|---|---|---|
| $CO_2$ | 0.2 | 7.0 |
| $C_2H_4$ | 61.0 | 61.0 |
| Higher olefins | 10.3 | 10.3 |
| CO | 6.8 | 0.0 |
| $H_2$ | 9.5 | 9.5 |
| Paraffins | 11.3 | 11.3 |
| $N_2$ | 0.9 | 0.9 |
|  | 100.0 | 100.0 |

The copper salt solution leaving the reactor is treated at the same temperature in a second reaction tube with 1.36 liters per hour of oxygen and reconducted into the first reactor.

We claim:

1. A process for the conversion of small amounts of carbon monoxide, contained in a gaseous mixture comprising olefins, into carbon dioxide, which process comprises contacting said gaseous mixture with an acidic solution containing as essential ingredients cuprous and cupric copper, and about 0.2 to 0.5 gram per 100 grams of copper of a noble metal salt of group VIII of the periodic system as catalyst.

2. A process for the conversion of small amounts of carbon monoxide, contained in a gaseous mixture comprising olefins, into carbon dioxide, which process comprises contacting said gaseous mixture at atmospheric pressure and at a temperature of 20 to 100° C. with an acidic solution containing as essential ingredients cuprous and cupric copper, and about 0.2 to 0.5 gram per 100 grams of copper of a noble metal salt of group VIII of the periodic system as catalyst.

3. A process for the conversion of small amounts of carbon monoxide, contained in a gaseous mixture comprising olefins, into carbon dioxide, which process comprises contacting said gaseous mixture at a temperature of 20 to 100° C. with an acidic solution containing as essential ingredients cuprous and cupric copper, 10 to 70% of the copper being present as cupric copper and 90 to 30% as cuprous copper throughout the reaction, said solution also containing about 0.2 to 0.5 gram per 100 grams of copper of a noble metal salt of group VIII of the periodic system as catalyst.

4. A process for the conversion of small amounts of carbon monoxide, contained in a gaseous mixture comprising olefins, into carbon dioxide, which process comprises contacting said gaseous mixture under a pressure of up to 15.4 atmospheres and at a temperature of 20 to 190° C. with an acidic solution containing as essential ingredients cuprous and cupric copper, and about 0.2 to 0.5 gram per 100 grams of copper of a noble metal salt of group VIII of the periodic system as catalyst.

5. A process for the conversion of small amounts of carbon monoxide, contained in a gaseous mixture comprising olefins, into carbon dioxide, which process comprises contacting said gaseous mixture with an acidic solution containing as essential ingredients cuprous and cupric copper, 10 to 70% of the copper being present as cupric copper and 90 to 30% as cuprous copper throughout the reaction, said solution also containing about 0.2 to 0.5 gram of palladium salt per 100 grams of copper as catalyst.

6. A process according to claim 4 wherein the catalytic salt is a rhodium salt.

References Cited in the file of this patent

UNITED STATES PATENTS

| | | |
|---|---|---|
| 1,597,345 | Dely | Aug. 24, 1926 |
| 2,043,263 | Porter | June 9, 1936 |
| 2,381,707 | Wood et al. | Aug. 7, 1945 |
| 2,475,155 | Rosenblatt | July 5, 1949 |
| 2,802,889 | Frevel et al. | Aug. 13, 1957 |
| 2,930,672 | Morris | Mar. 29, 1960 |

FOREIGN PATENTS

| | | |
|---|---|---|
| 20,616 | Great Britain | July 1, 1915 |
| 540,896 | Germany | Dec. 28, 1931 |
| 547,351 | Canada | Oct. 8, 1957 |

OTHER REFERENCES

Berkman et al.: Catalysis, Reinhold Pub. Corp., 1940, pages 775–777.

Zenghelis et al.: Chemical Abstracts, 1952, volume 46, page 5398(a).